Feb. 6, 1951 R. W. MILLER 2,540,829
TRACTION MOTOR LUBRICATOR
Filed Dec. 7, 1945 3 Sheets-Sheet 1

INVENTOR.
Rudolph W. Miller
BY
ATTORNEYS

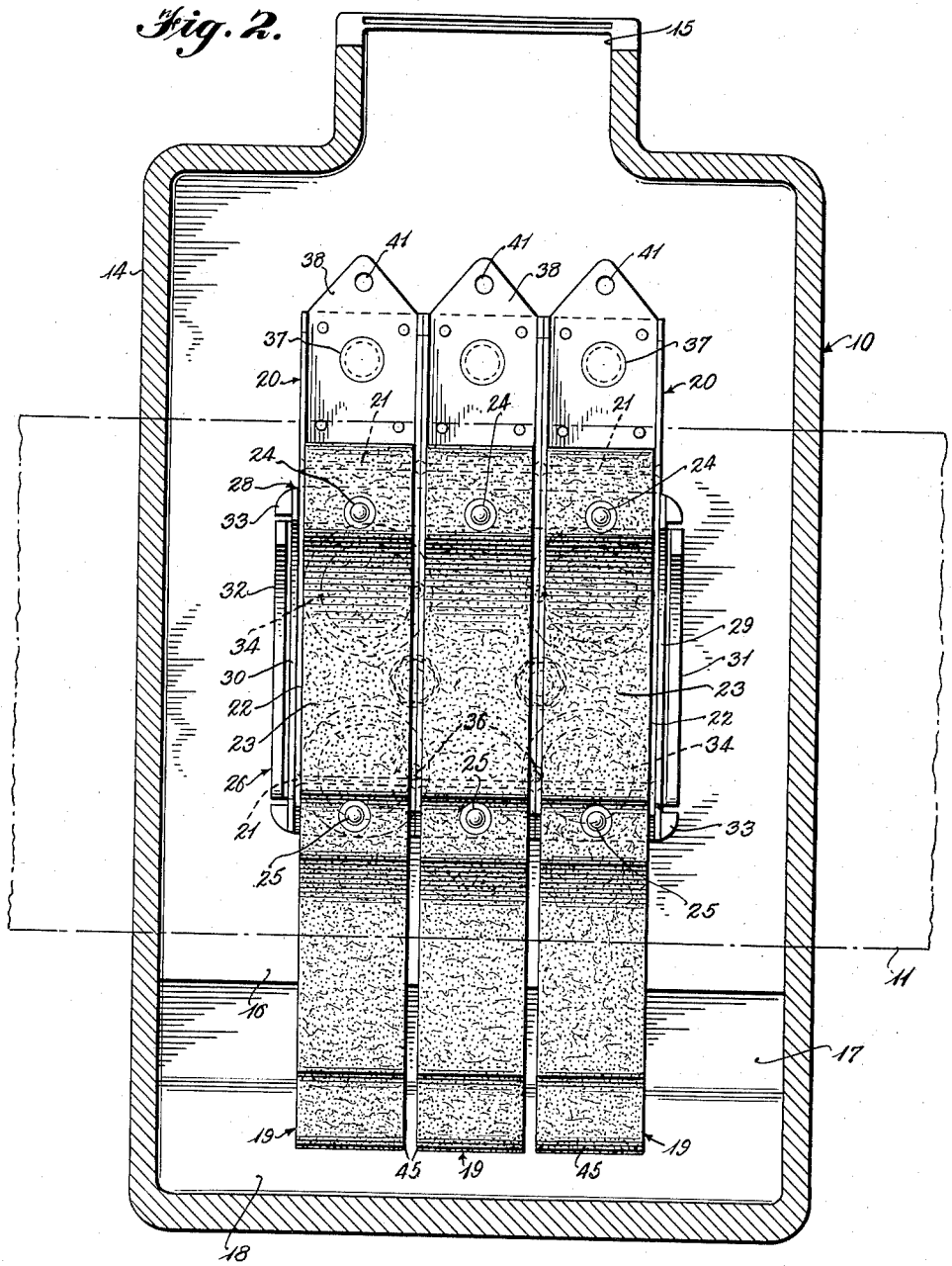

Feb. 6, 1951  R. W. MILLER  2,540,829
TRACTION MOTOR LUBRICATOR
Filed Dec. 7, 1945  3 Sheets-Sheet 3
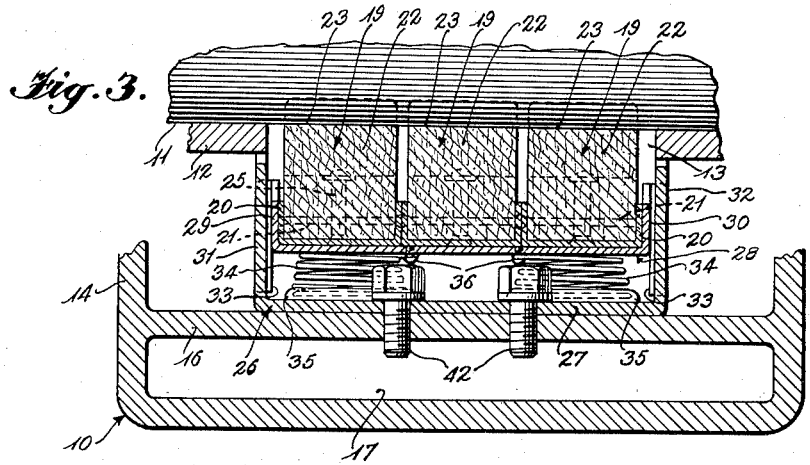
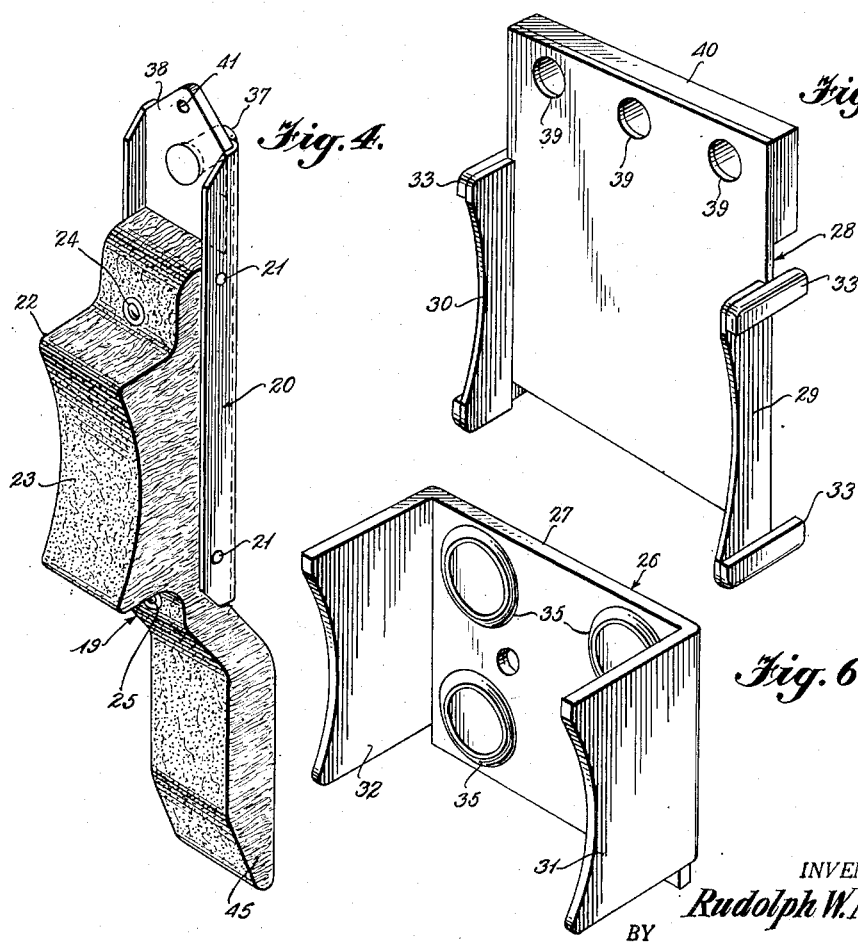
INVENTOR.
Rudolph W. Miller
BY
ATTORNEY.

Patented Feb. 6, 1951

2,540,829

UNITED STATES PATENT OFFICE 2,540,829

TRACTION MOTOR LUBRICATOR

Rudolph W. Miller, Winona, Minn., assignor to Gladys D. Miller, Winona, Minn.

Application December 7, 1945, Serial No. 633,433

6 Claims. (Cl. 308—132)

The invention relates to journal lubricator and has as an object the provision of a lubricator particularly fitted for use with Diesel engines although it may also be applied to electric motors, or other uses.

It is an object of the invention to provide a lubricator comprising a felt body or bodies having a portion depending into an oil sump and a portion fitting the journal to furnish lubrication thereto and spring pressed thereagainst.

It is a further object of the invention to provide a lubricator that may be readily assembled with a journal box.

Further objects of the invention will appear from the following description when read in connection with the accompanying drawings showing an illustrative embodiment of the invention wherein:

Fig. 2 is a vertical section on line 2—2 of Fig. 1;

Fig. 3 is a detail transverse section on line 3—3 of Figure 1;

Figure 1:
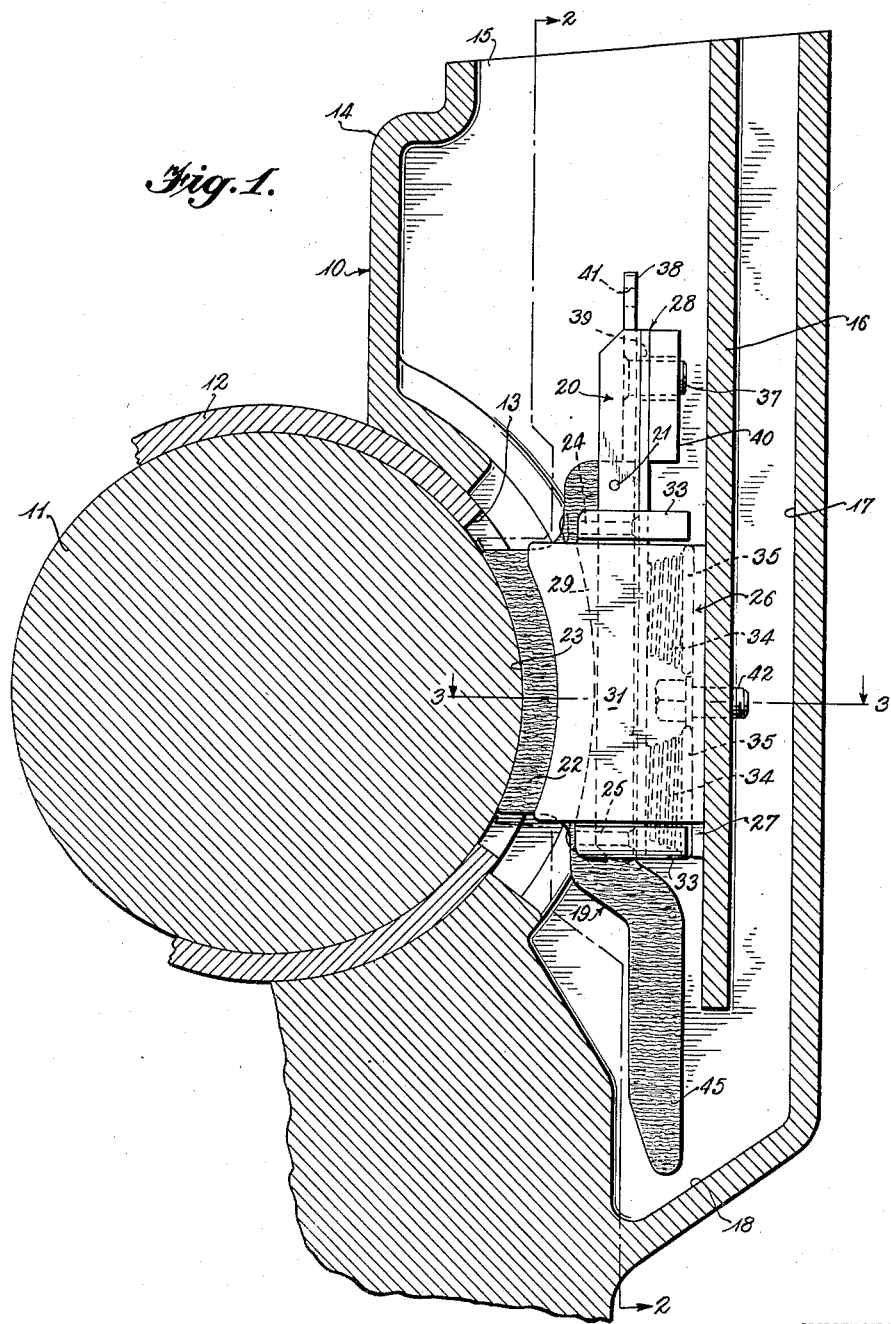
Figure 1 is a vertical transverse section through a journal and journal box showing a lubricator in position.

Figs. 4, 5, and 6 are respectively perspective views of portions of the lubricator.

As shown, the device is applied in a journal box 10 for lubrication of a shaft 11 mounted to rotate in a bearing 12. The lubricator is shown as contacting with the shaft by projecting through a window 13 in the bearing.

The journal box as shown is made up of a casing 14 having an opening 15 at its upper end and in the form shown the opening 15 is of less width than the total width of the lubricator illustrated.

The journal box is shown as formed with a partition plate 16 cast integral with the journal box thus providing a passageway 17 leading to a sump 18 for receipt of a supply of liquid lubrication.

It will be seen that because of the depth of the journal box a pool of lubrication in the sump 18 cannot splash out of the box.

As shown the lubricator is made up of felt bodies 19, each retained in a trough-shaped member 20, as for instance by pins 21 projecting through the sides of the trough and through the felt body. The bodies 19 each comprise a depending portion 45 which dips into the body of oil in the sump and by capillary attraction saturates the entire body. The bodies are also formed with a thickened portion 22 having an arcuate surface 23 to fit the journal. Desirably the felt bodies are made up of a thick felt having a majority of the fibers perpendicular to the arcuate surface 23 thereby tending to prevent fibers from being pulled out of the bodies by friction of the journal.

In addition to the pins 21 or instead thereof the felt bodies may be secured to the troughs 20 by rivets 24, 25. To support the troughs 20 in position, there is shown a channel or U-shaped member 26 having a plate portion 27 shown as secured to the partition 16 by means of cap screws 42 and a movable plate 28 having upstanding sides 29, 30 dimensioned to fit between the sides 31, 32 of the member 26 and slidable therein. To guide the sliding movement of the member 28—30 there are shown guides 33 standing at the edges of the members 29, 30.

To press the felt bodies 19 against the journal, the plate 28 is urged away from the plate 27 by springs 34 acting in compression, which springs are secured at their bases to the plate 27 and at their outer ends to the plate 28. By way of attachment of the springs 34 to the plate 27 there are shown hollow seats 35 welded or riveted to the plate 27 and being of shallow cup shape with their margins turned about the base turns of the springs 34. The outer ends of the spring 34 may be secured to the plate 28 by bending their termini each about a rivet 36 secured in plate 28. To hold the trough members 20 in position on plate 28, there is shown a stud 37 fixed in a thickening plate 38 fitting between the sides of the troughs 20 and rigidly secured therein. The studs 37 enter openings 39 in plate 28, when the lubricator is assembled, a reinforcing plate 40 being shown as applied to the plate 28 for coaction with the studs 37.

In assembly of the device each of the troughs 20 with its felt body may be inserted through the opening 15, the plate 28 depressed to allow of such insertion and the pins 37 entering the openings 39. It will be understood that where it is possible to provide a journal box having an opening 15 as wide as the entire assembly of lubricators a single trough 20 carrying a single felt body or a plurality thereof may be utilized.

In the assembly and removal of the portions of the lubricator, a hook tool may be utilized for engagement with the openings 41 in the reinforcing plates 38. The plate 26 is shown as secured to the partition 16 by means of a cap screw 42. The member 26 is inserted through the opening in journal box 14, provided for exposure of window 13, secured to the partition 16, and the member 28—30 and springs 34 are assembled therewith before the journal box is applied to the shaft 11.

A difficulty with oil lubrication of journals from a pool of oil has been that oil splashes upon the journal surface resulting in excess lubrication with resulting waste of oil escaping along the journal surface at one or both ends of the box. It will be noted that in the structure of the present invention the wick 45 stands closely adjacent the front of the box. It is within the purview of the invention to provide contact of the wick with the wall of the box at this point. The space in front of the wick enlarges from this point upward. Any splashed oil in front of the wick is therefore prevented from reaching the journal surface and only results in more thorough saturation of the wick.

The physical embodiment of the invention shown and described is that at present preferred. It is obvious, however, that the window 13 and the pads 23 can be placed at other angular relations with the journal and that other provisions for support of the pads for motion toward, and from the journal may be made and that other minor changes may be made in the physical embodiment of the invention within the scope of the appended claims, without departing from the spirit of the invention.

I claim:

1. In a traction motor lubricator adapted for use in a journal box, a base, a supporting member connected thereto by resilient means allowing movement of the supporting member toward and from the base, a felt holder, a felt body retained in said holder and having a journal contact surface projecting from the holder, said supporting member and said felt holder having substantially flat contacting surfaces, one of said surfaces having a stud projecting therefrom for engagement within an opening in the other surface to retain the felt holder in position on the supporting member, said supporting member being depressible toward said base against the force of the resilient means to release the stud from the opening and allow the felt holder to be slid off the supporting member and removed from the journal box.

2. In a traction motor lubricator, an elongated felt body having a thickened portion on one side thereof providing an arcuate surface for contact with the journal to be lubricated, a holder for the felt body having lateral flanges of less height than the thickness of said thickened portion which flanges partially embrace the sides of said thickened portion to give it lateral support, said holder extending beyond one end of the felt body and having means on the extending portion for connecting the holder to a support, the other end of the felt body having a portion extending beyond the holder to form a depending wick.

3. In a lubricator for journals of traction motors, a carrier comprising a base and a supporting plate connected to the base by resilient means allowing movement of the supporting plate toward and from the base, said supporting plate having an opening, a felt holder, a felt body retained in said holder and having a journal contact surface projecting from the holder and a stud on the holder normally seated in said opening to retain the holder in position on the supporting plate, said supporting plate being depressible toward said base against the force of the resilient means to release said stud from the opening and allow removal of the holder from the supporting plate.

4. In a lubricator for journals of traction motors, a carrier comprising a base and a supporting plate connected to the base by resilient means allowing movement of the supporting plate toward and from the base, said supporting plate having therein a plurality of openings, a corresponding plurality of felt holders, a felt body retained in each of said holders and having a journal contact surface projecting from the holder and a stud on each holder normally seated in one of said openings to retain the holder in position on the supporting plate, said supporting plate being depressible toward said base against the force of the resilient means to release said studs from the openings to allow independent removal of each of said holders from the supporting plate.

5. An article of manufacture for use in a lubricator for journals of a traction motor, said article consisting of an elongated carrier of channel form having a base and flanges extending in one direction from the opposite edges of the base and a stud on said base extending in a direction opposite that of the flanges, and an elongated felt body having a thickened portion seated on the base and held between said flanges, the thickened portion being greater in thickness than the height of the flanges and having an arcuate surface the axis of which is perpendicular to said flanges, said arcuate surface being adapted to contact with and closely conform to a journal to be lubricated, and said felt body having a thinner portion extending beyond the end of the carrier to serve as a depending wick to feed lubricant from a reservoir to the thickened portion.

6. An article of manufacture as set forth in claim 5 in which one end of the carrier extends beyond the end of the felt body and has a hole in the extending portion for engagement with a tool whereby the carrier and felt body may be withdrawn from the lubricator.

RUDOLPH W. MILLER.

REFERENCES CITED

The following references are of record in the file of this patent:

UNITED STATES PATENTS

| Number | Name | Date |
| --- | --- | --- |
| 161,017 | Eggleston | Mar. 23, 1875 |
| 215,508 | Covel | May 20, 1879 |
| 488,402 | Pugh | Dec. 20, 1892 |
| 595,999 | Harrison | Dec. 21, 1897 |
| 602,959 | Rogers | Apr. 26, 1898 |
| 1,764,541 | Wickizer | June 17, 1930 |
| 2,001,182 | Cardwell | May 14, 1935 |
| 2,009,323 | Penniman | July 23, 1935 |
| 2,283,939 | Miller | May 26, 1942 |